April 11, 1950 M. BREUER 2,503,933

PLYWOOD FURNITURE FRAME

Filed April 3, 1946 5 Sheets-Sheet 1

Inventor
Marcel Breuer
by Roberts, Cushman & Grover
attys.

Inventor
Marcel Breuer
by Roberts, Cushman & Grover
att'ys.

April 11, 1950 M. BREUER 2,503,933

PLYWOOD FURNITURE FRAME

Filed April 3, 1946 5 Sheets-Sheet 3

Inventor
Marcel Breuer
by Roberts, Cushman & Grover
att'ys.

PLYWOOD FURNITURE FRAME

Filed April 3, 1946 5 Sheets-Sheet 4

Inventor
Marcel Breuer
by Roberts, Cushman & Grover
att'ys.

April 11, 1950 M. BREUER 2,503,933

PLYWOOD FURNITURE FRAME

Filed April 3, 1946 5 Sheets-Sheet 5

Inventor
Marcel Breuer
by Roberts, Cushman & Grover
attys.

Patented Apr. 11, 1950

2,503,933

UNITED STATES PATENT OFFICE 2,503,933

PLYWOOD FURNITURE FRAME

Marcel Breuer, Cambridge, Mass.

Application April 3, 1946, Serial No. 659,288

2 Claims. (Cl. 155—187)

This invention relates to the manufacture of furniture and particularly the manufacture of plywood frames for use as component parts of articles of furniture.

Plywood is made up of a number of veneer sheets or layers of wood, usually three or more such layers, glued together, the grain of adjacent layers extending relatively transversely and usually at approximately right angles to each other.

The purpose of the present invention is to produce plywood frames for use in the manufacture of articles of furniure, so constructed and designed as to utilize the strength, elasticity and other excellent qualities of plywood and to make the frames in such forms as to achieve maximum economy in the consumption of plywood.

To these ends I cut out the frame members from a board of plywood by saw cuts crosswise of the plies, the frame member having such shape that the opposite cut sides of the frame member have a non-rectilinear contour, the contour of one such cut side being substantially identical with the contour of the opposite cut side, whereby each cut side of the frame member will make a nesting fit with the opposite cut side of another like frame member. A number of important advantages flow from this nesting fit relationship. It permits cutting the maximum number of frame members from a given piece of plywood since each cut side conforms to the opposite cut side of an adjacent frame member of like shape, separated only by the thickness of the saw cut. It provides for the nesting of several similar articles of furniture when the frames are fabricated into furniture, if the construction of the furniture otherwise permits nesting, for the purpose of storage or transportation, or of merely stacking within a room where it is desired to clear floor space. It allows nesting and close packing of similar frame parts in the factory before they are assembled into finished furniture, thus saving factory space. It affords additional thickness, and consequently additional strength and stiffness, at bends or curves of the frames where strength and stiffness are most required.

I have also discovered that a cut strip of plywood of proper cross-sectional dimensions possesses an astonishing flexibility and elasticity in the direction of the plane of the plies, and at the same time possesses adequate strength to provide an elastic or springy frame member or selected part of a frame member where elasticity is desired. Such elasticity in the direction of the plane of the plies may be obtained by cutting from the board of plywood a frame member, or that part of the frame member which is to constitute a spring, in the form of a strip whose width crosswise of the plies is at least as great as and preferably greater than the width of strip in the direction of the plies. If the crosscut width is less than the width in the plane of the plies, the bending of the strip in the direction of the plane of the plies will tend to spring or buckle the frame sidewise. Plywood frame members having this flexibility and elasticity in the plane of the plies admit of an extraordinarily simple and cheap method of manufacture, namely, merely sawing out the members of the desired profile crosswise of the plies from a board of plywood without subsequent bending or other fashioning into the desired shape. The structure of such plywood frame members is not to be confused with that of strips of laminated wood in which the grains of the layers run in the same direction and the strip requires further shaping operations to make it into a frame member having a non-rectilinear profile, and in which the flexibility, if any, is in a direction crosswise of the layers and not in a direction planewise of the layers.

In the accompanying drawings which illustrate certain preferred embodiments of the invention, Fig. 1 is a side elevation of one of the side frames of a simple form of a chair, said side frame including two assembled plywood frame members;

Figure 1:
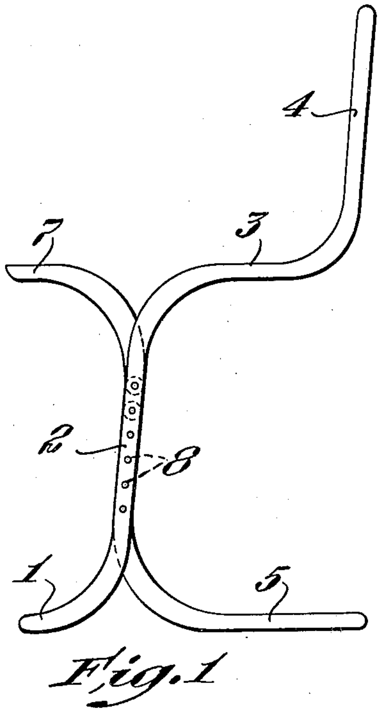
Figure 2:
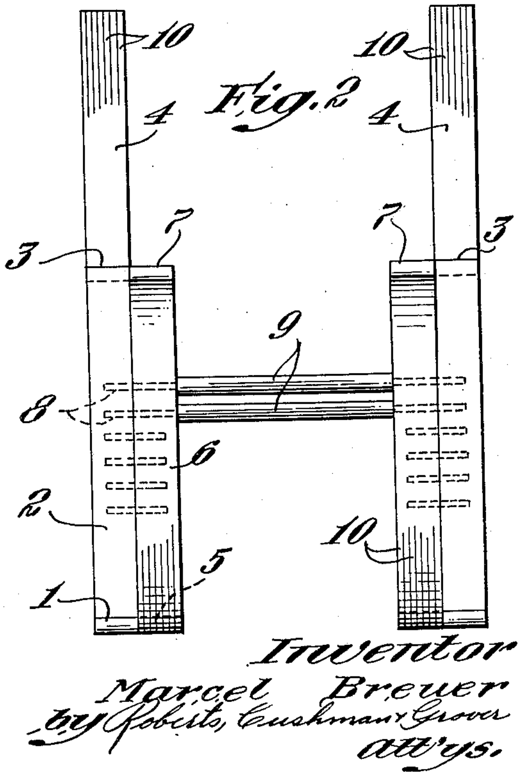
Fig. 2 is a front elevation of two side frames, of the kind shown in Fig. 1, joined together to form a complete chair frame.

Referring to Figs. 1 and 2, the side frame of the chair consists of two frame members, one of which has a forwardly extending foot 1 to rest on the floor, an upright supporting section 2, a seat section 3 and a back section 4, and the other of which members has a base section or foot 5 to rest on the floor, an upright supporting section 6, and a forwardly extending seat supporting section 7. Said frame members are joined side by side, as by dowel pins 8 or the like, to form the side frame of the chair. Each frame member is made of plywood cut crosswise of the plies, the planes of the plies extending vertically to the floor, that is, in the direction in which the principal stresses are applied to the frame members when in use.

Figure 3:
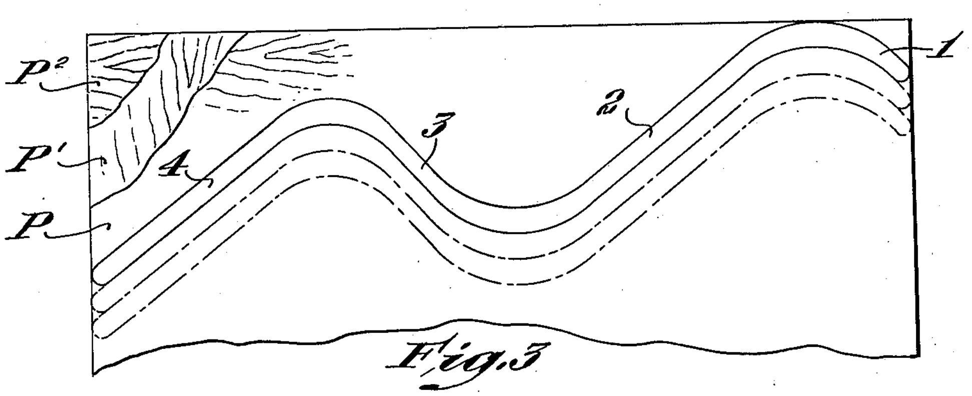
Fig. 3 is a plan view of a board of plywood, partly broken away, showing the method of cutting identical frame members, each constituting one part of the side frame shown in Fig. 1 and Fig. 2, but on a somewhat larger scale, the nested relationship of said frame members affording the greatest economy of material.

The first frame member is fashioned in the manner illustrated in Fig. 3, in which P represents a board of plywood, certain of the plies being broken away to reveal underlying plies, as indicated at P1 and P2. A series of frame members are cut crosswise of the plies and of such contour as to form the aforesaid sections 1, 2, 3, and 4 of each frame member. The several frame members cut from the plywood board are identical and in nested relationship, separated only by the thickness of the saw cut. Thus the maximum possible number of frame members are obtained from the same board of plywood, the only waste being the irregular fragments at each end of the board.

The contour of one side cut of each frame member is identical with the opposite side cut of said frame member, from which it follows that each side cut of the frame member will make a nesting fit with the opposite side cut of another like frame member, and it also follows that the bends or curves connecting the different sections of the member, being constructed on the same radius for each cut side, are thickened and reenforced, thus strengthening and stiffening the frame member at the regions where strength and stiffness are most required.

The second frame member, consisting of sections 5, 6 and 7, is similarly cut crosswise of the plywood board P (Fig. 4) and affords similar advantages as to economy, nesting and reenforcement of curves as described in connection with the first frame member.

Two composite side frames of the form illustrated in Fig. 1 are asembled beside each other in suitably spaced relation and joined in any suitable manner, as by cross rods 9, to form a complete chair frame as shown in Fig. 2.

The planes of the plies of the cross-cut plywood frame members are indicated at 10 (Fig. 2). The thinner sections of the frame member, such as sections 3 and 5, provide a limited flexibility and elasticity in the chair frame in the direction of the plane of the plies for the comfort of the user. Suitable flexibility and elasticity of such thinner sections may be obtained as a practical matter by cutting them to a width or thickness ranging substantially from ⅝" to 1" depending on the expected load to be carried. It is to be understood that any suitable form of chair seat may be applied to the seat-supporting sections 3 and 7, and any suitable form of back support may be applied to the back sections 4.

Figure 7:
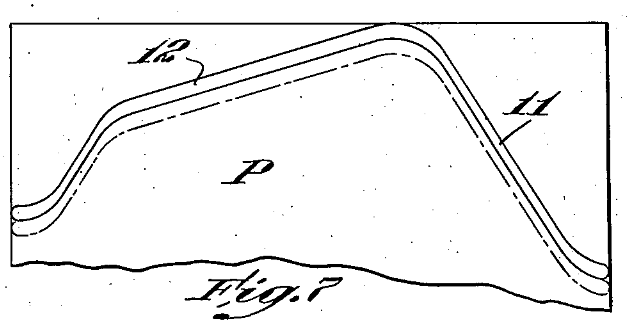
Figs. 7, 8 and 9 are plan views of a board of plywood, showing the method of cutting identical frame members, each constituting one of the component parts of the side frame shown in Figs. 5 and 6, and each illustrating the economical, nested relationship of the frame members.

Referring to Figs. 5 to 9, which illustrate frames for a semi-reclining armchair, each side frame of the chair (Figs. 5 and 6) consists of three frame members each made of cross-cut plywood. One of said frame members forms a seat section 11 and a back section 12. This frame member and like frame members are cut from a board of plywood P in the manner already described and in nested relation as illustrated in Fig. 7. Another of said side frame members forms an arm section 13, an upstanding support 14 and a forwardly extending foot 15, and is cut from a board of plywod P in the manner illustrated in Fig. 8. The third of said side frame members consists of an upright section 16 and a rearwardly extending foot or base section 17. The upright 16 and the upright 14 are secured side by side by means of dowel pins 18 or the like.

Two of said composite side frames are connected together by means of a cross rod 19 joining the tops of the back sections, a cross rod 20 joining the rear ends of the arm sections and also forming a support for the back sections, a cross rod 21 joining the forward ends of the seat sections, a cross rod 22 joining the upright sections and also supporting the seat sections, and a cross rod 23 joining the angles between the seat and back sections.

It will be understood that a suitable seat is to be applied to the seat sections 11 and a suitable back rest is to be applied to the back sections 12.

The elasticity of the several frame members, particularly in their thinner regions, provides a somewhat flexible and springy chair frame that contributes to the comfort of the user.

Figs. 10 to 13 illustrate the construction of a simple chair of different form but constructed on similar principles. A pair of legs 24, 25, connected by an integral strong bridge section 26, is cut from a board P of plywood crosswise of the plies in the manner illustrated in Fig. 12. Two pairs of said legs are connected by cross beams 27, the assembled structure constituting a support for the seat and back of the chair. The seat and back consist of two like side frames, each having a seat section 28 and a back section 29, to which are applied a suitable form of seat and back structure, for example, as herein shown, cross slats 30. The seat and back frames are cut from a board of plywood P crosswise of the plies in the manner shown in Fig. 13. It will be noted that the two pairs of legs are offset outwardly beyond the edges of the seat and back with the result that the finished chairs may be nested one on top of another for storage.

Figure 14:
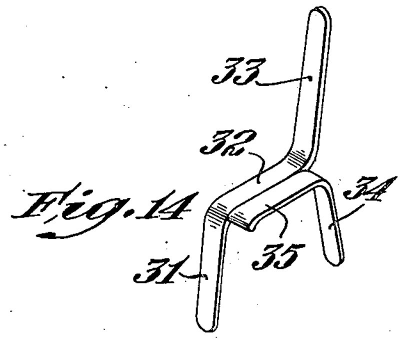
Fig. 14 is a perspective view of the side frame of another form of chair, including two assembled plywood frame members, the completed chair constructed with this form of side frames being capable of nestling with other like chairs.

Fig. 14 represents in perspective a side frame of a chair consisting of two members, each cut from plywood crosswise of the grain in the manner already described. One frame member consists of a front leg 31, a seat section 32 and a back section 33. The other frame member consists of the back leg 34 and a seat section 35. The two seat sections 32 and 35 are fastened together side by side by dowel pins or other suitable means with the back leg member 34, 35, on the outer side of the completed chair structure, which it will be understood contains two similar composite side frames connected by a seat and back rest. This type of chair is also adapted for nesting with other like chairs one on top of another.

Figure 17:
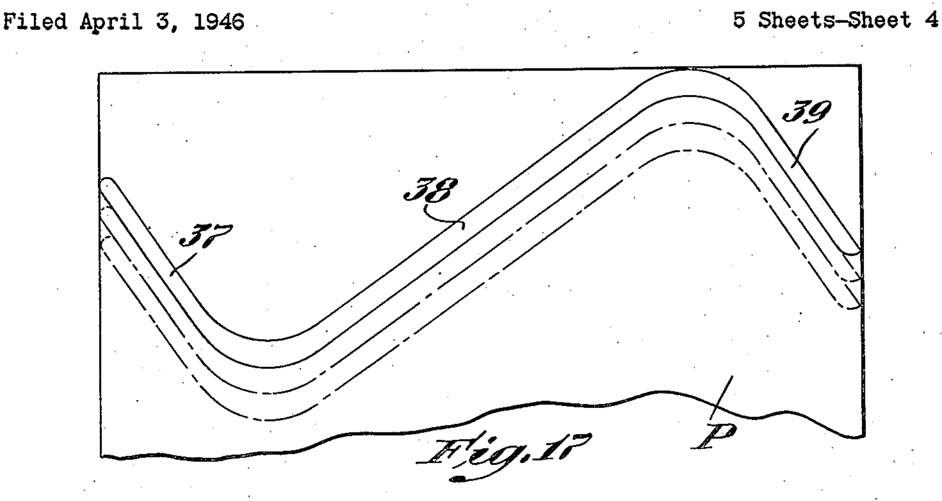
Fig. 17 is a plan view of a board of plywood showing the method of cutting the frame members of Figs. 15 and 16 in nested relation.
Figures 15, 16:
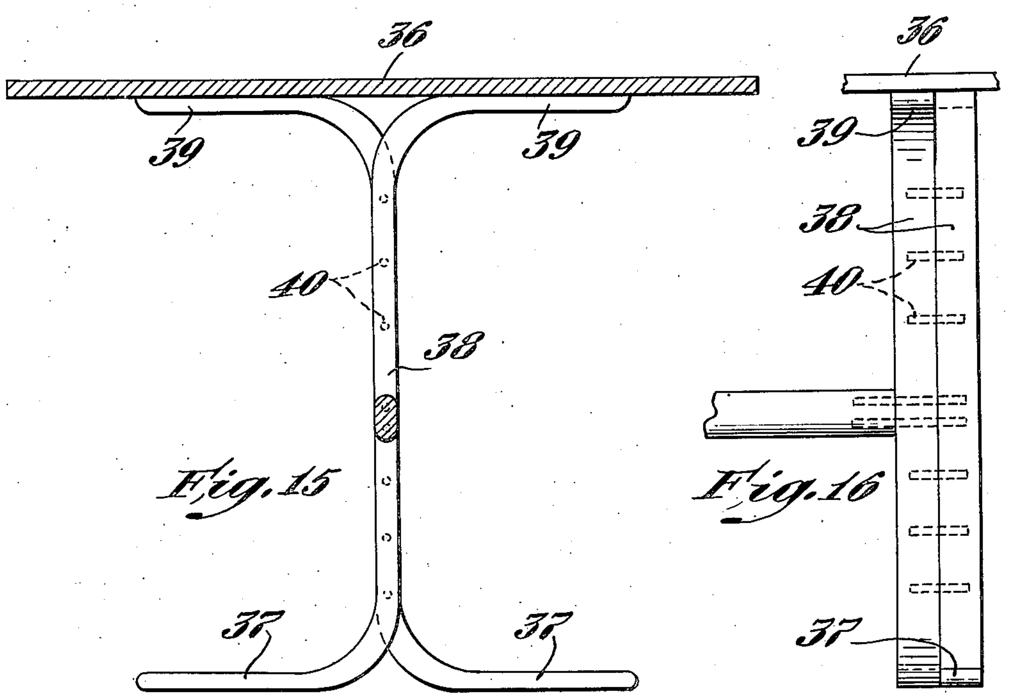
Fig. 15 is a vertical section of a table showing an inside elevation of one of the legs of the table having two upright supports, each including two identical assembled plywood frame members.
Fig. 16 is a front view of the support shown in Fig. 15.

Figs. 15, 16 and 17 illustrate the application of the invention to a table. The table top 36 is supported by a leg and base at each end of the table top. The leg and base consist of two like frame members, each having a foot or floor piece 37, an upright section 38 and a rest 39 for the table top. The two upright sections 38 are fastened together side by side by dowel pins 40 or other suitable means. Each frame member constituting part of the composite leg and base is cut crosswise of the plies from a board of plywood P, in nested relation to other like members, as shown in Fig. 17.

Figure 21:
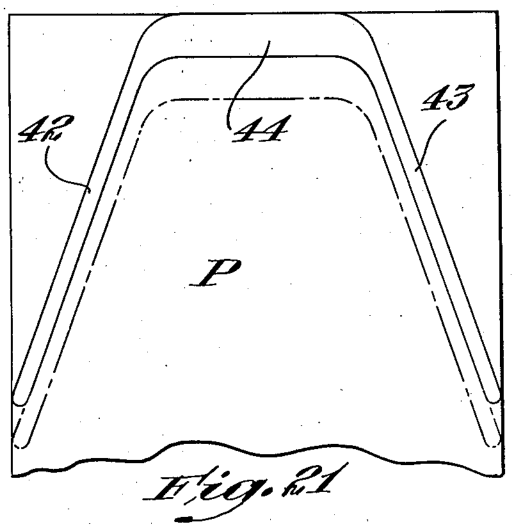
Fig. 21 is a plan view of a board of plywood showing the method of cutting each pair of legs of said table in nested relation, each pair constituting an integral frame member.
Figure 18:
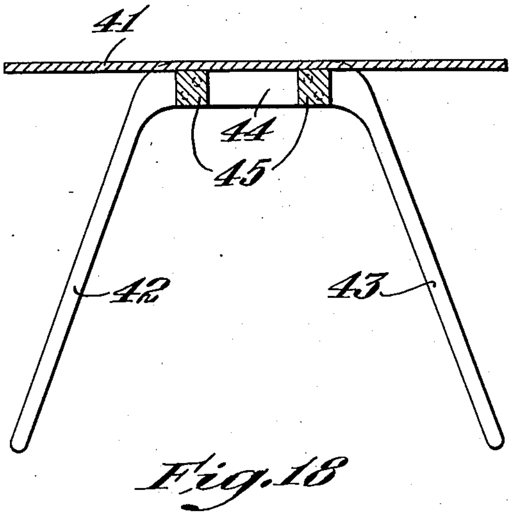
Fig. 18 is a view of one end, partly in section on line 18—18 of Fig. 19, of another form of table, which has a pair of plywood legs at each end, each pair being integrally cut from a board of plywood, the table being capable of nesting with other like tables.
Figure 19:
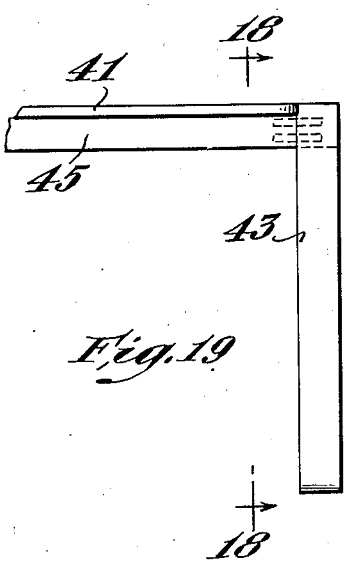
Fig. 19 is an elevation of the table structure shown in Fig. 18, viewed at right angles thereto.
Figure 20:
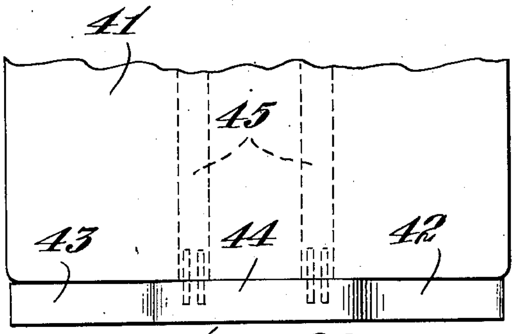
Fig. 20 is a plan view of the structure shown in Figs. 18 and 19.

Figs. 18 to 21 illustrate the application of the invention to another form of table. The table top 41 is supported by and between two pairs of legs which are located outside and beyond the area of the table top. Each pair of legs 42 and 43 integrally connected by a bridge section 44 is cut crosswise of the plies from a board of plywood P in nested relationship to other like units as illustrated in Fig. 21. The bridge sections 44 of the two pairs of legs are connected by cross beams 45 on which the table top 41 rests between and flush with the top surfaces of the bridge sections 44. A number of completed tables of this construction may be nested one on top of another.

From the foregoing it will be evident that the article of furniture comprises elongate frame members having integral upright and transverse portions defining angles at the junctions therebetween on two opposite sides of each member as shown in Figs. 1, 3, 4, 5, 7, 8, 9, 10, 12 and 13. Transverse supports are mounted on the transverse portions, the transverse supports comprising seats in the case of chairs and tabletops in the case of tables.

Figure 4:
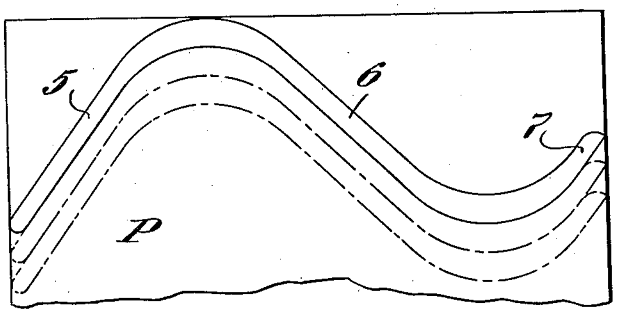
Fig. 4 is a plan view of a board of plywood showing the method of cutting identical frame members in nested relationship, each constituting the other part of said side frame, but on a somewhat larger scale.
Figure 8:
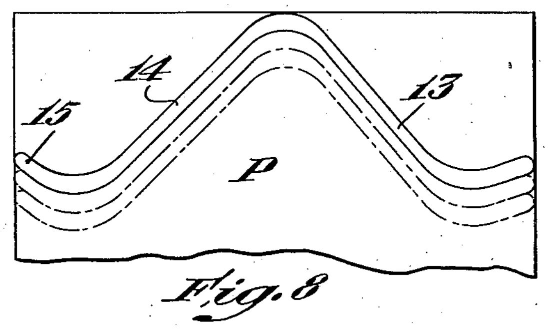
Figure 9:
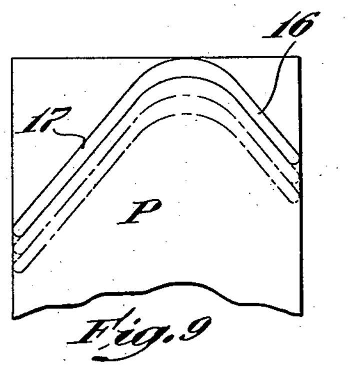
Figures 5, 6:
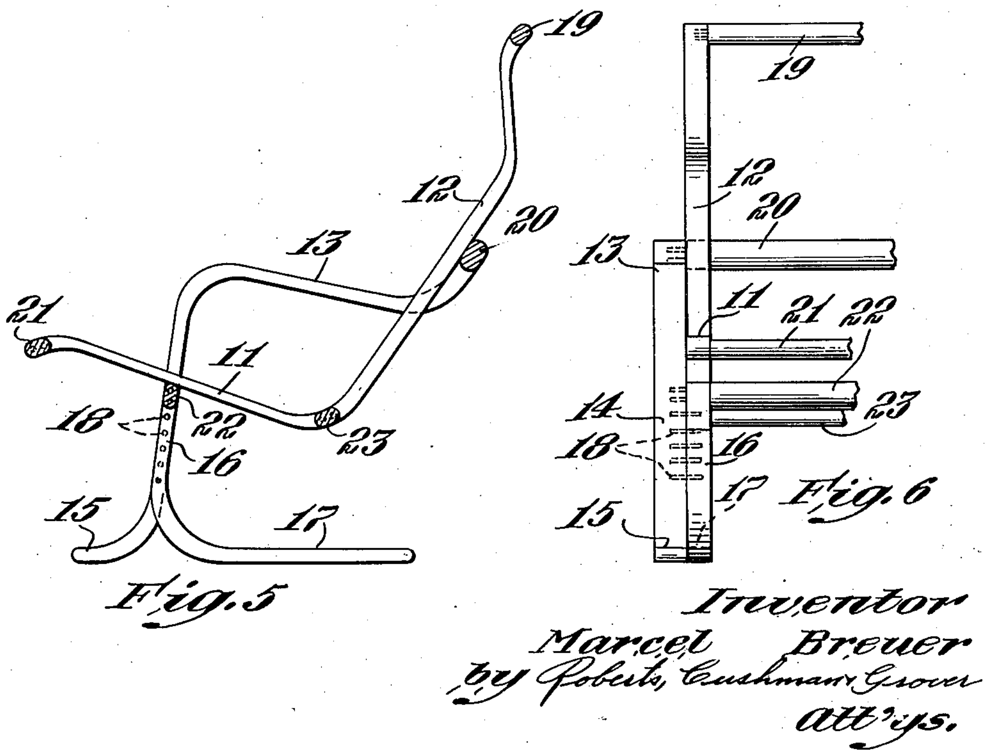
Fig. 5 is a vertical section of a semi-reclining armchair, showing one of the side frames in inside elevation, said side frame including three assembled plywood frame members.
Fig. 6 is a front elevation of the side frame of Fig. 5, showing the structure for joining it to a similar side frame to form a complete chair frame.
Figure 13:
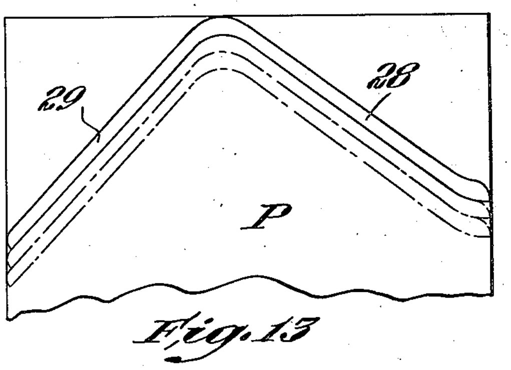
Figs. 12 and 13 show the method of cutting the frame members in nested relation from a board of plywood for constructing the side frames of the chair of Figs. 10 and 11.
Figure 12:
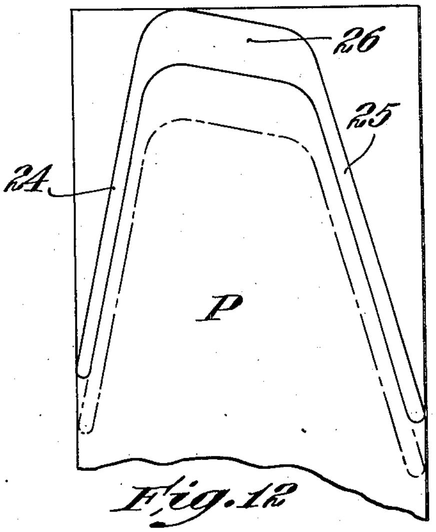
Figure 10:
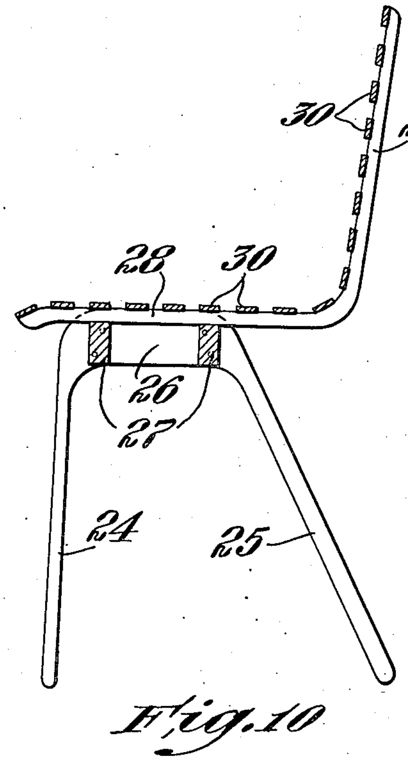
Fig. 10 is a vertical section of another form of chair, the side frame of whch includes two assembled plywood frame members, the assembled and completed chair being capable of nesting with other like chairs.
Figure 11:
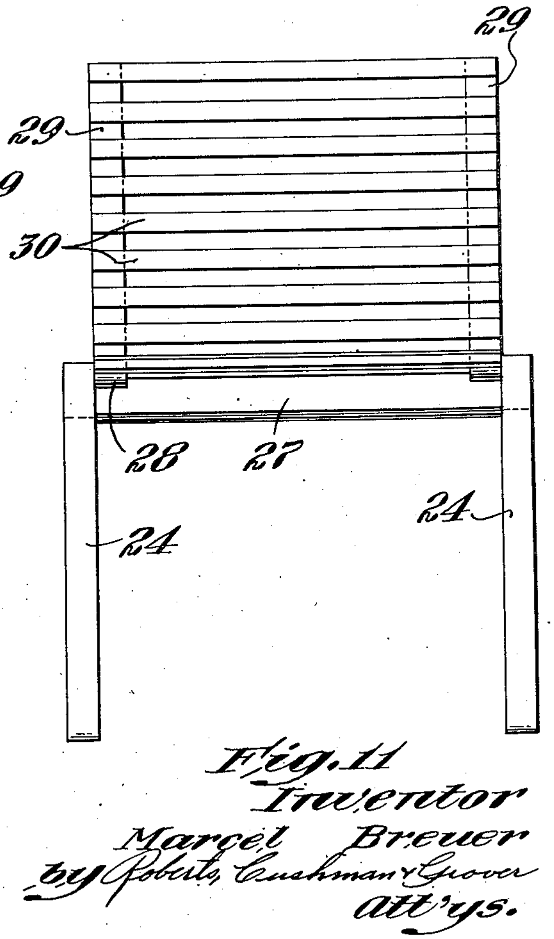
Fig. 11 is a front elevation of the chair shown in Fig. 10.

In each form of the invention herein shown it will be noted that each frame member is made of plywood cut crosswise of the plies, the planes of the plies extending in the direction in which the principal stresses or loads are applied to the article of furniture when in use; each frame member has opposite cut sides of non-rectilinear contour, the contour of one cut side being substantially identical with the contour of the other cut side, whereby each cut side of the frame member will make a nesting fit with the opposite cut side of another like frame member; elasticity in the direction of the plane of the plies may be obtained in varying degrees depending on the plane-wise width and its relation to the cross-cut width; and identical contours of the cut sides result in thickening and strengthening curves in the frame where reenforcement is most needed. It will also be noted that in each form in which a frame member has a plurality of turns the sum of each two juxtaposed angles on the same side of a member is substantially more than 180° so that a plurality of the members may be cut in nesting relationship from a slab of material with a minimum of waste. In preferred embodiments such as illustrated in Figs. 3, 4 and 8 one of the two angles is less than 180° and the other is greater than 180°.

I claim:

1. An article of furniture comprising elongate frame members having integral upright and transverse portions defining angles at the junctions therebetween on two opposite sides of each member, the other two sides of each member being disposed substantially in parallel planes, and a transverse support mounted on said transverse portions, said frame members comprising plywood having their plies extending substantially parallel to said planes and the sum of each two juxtaposed angles on the same side of each of said members being substantially more than 180° so that a plurality of the members may be cut in nesting relationship from a slab of material with a minimum of waste.

2. An article of furniture comprising elongate frame members having integral upright and transverse portions defining angles at the junctions therebetween on two opposite sides of each member, the other two sides of each member being disposed substantially in parallel planes, and a transverse support mounted on said transverse portions, said frame members comprising plywood having their plies extending substantially parallel to said planes and the sum of each two juxtaposed angles on the same side of each of said members being substantially more than 180°, one angle being less than 180° and the other being greater than 180°.

MARCEL BREUER.

REFERENCES CITED

The following references are of record in the file of this patent:

UNITED STATES PATENTS

| Number | Name | Date |
|---|---|---|
| 134,661 | Griffin | Jan. 7, 1873 |
| 874,434 | Portteus | Dec. 24, 1907 |
| 1,596,680 | Nelson | Aug. 17, 1926 |
| 1,718,321 | Vericel | June 25, 1929 |
| 1,735,851 | Burton | Nov. 19, 1929 |

FOREIGN PATENTS

| Number | Country | Date |
|---|---|---|
| 93,842 | Sweden | Dec. 20, 1938 |
| 104,712 | Australia | Aug. 1, 1938 |